United States Patent [19]
Valentyik et al.

[11] 3,857,489
[45] Dec. 31, 1974

[54] STABILIZATION OF SUSPENSIONS USED IN HEAVY-MEDIA SEPARATION PROCESSES

[75] Inventors: Laszlo Valentyik; John T. Patton, both of Houghton, Mich.

[73] Assignee: Board of Control Michigan Technological University, Houghton, Mich.

[22] Filed: Feb. 4, 1974

[21] Appl. No.: 439,381

Related U.S. Application Data

[63] Continuation-in-part of Ser. No. 225,609, Feb. 11, 1972, abandoned.

[52] U.S. Cl. .......................................... 209/172.5
[51] Int. Cl. ............................................. B03b 3/40
[58] Field of Search ................ 209/172, 172.5, 173; 252/61, 8.5 C, 8.5 R, 8.5 B, 8.5 D

[56] References Cited
UNITED STATES PATENTS

| | | | |
|---|---|---|---|
| 2,140,899 | 12/1938 | Davidson | 209/172.5 |
| 3,000,790 | 9/1961 | Jeanes | 252/8.5 X |
| 3,232,929 | 2/1966 | McNeely | 252/8.5 X |
| 3,243,000 | 3/1966 | Patton | 252/8.5 X |
| 3,699,042 | 10/1972 | Browning | 252/8.5 C |
| 3,728,259 | 4/1973 | Christman | 252/8.5 |

FOREIGN PATENTS OR APPLICATIONS

| | | | |
|---|---|---|---|
| 514,515 | 11/1939 | Great Britain | 209/172.5 |
| 801,637 | 2/1961 | Great Britain | 209/172.5 |

*Primary Examiner*—Robert Halper
*Attorney, Agent, or Firm*—Michael, Best & Friedrich

[57] ABSTRACT

Heavy-media suspensions, having improved stability and the capability of providing more efficient and accurate separations than conventional clay-supported suspensions, are made by using water-soluble heteropolysaccharides produced by the action of bacteria of the genus Xanthomonas on a carbohydrate as the primary stabilizing additive. The heteropolysaccharide, added in amounts ranging from about 0.01 to about 1.0, preferably about 0.05 to about 0.5 weight percent, based on the weight of the water in the suspension, forms the medium into a pseudoplastic hydrocolloid which maintains the fine media particles in the suspension but permits the larger feed particles to move freely, thereby effecting a more effective and efficient separation.

3 Claims, No Drawings

STABILIZATION OF SUSPENSIONS USED IN HEAVY-MEDIA SEPARATION PROCESSES

CROSS REFERENCE TO RELATED APPLICATION

This application is a continuation-in-part of application Ser. No. 225,609, now abandoned filed on Feb. 11, 1972.

BACKGROUND OF THE INVENTION

This invention relates to heavy-media separation processes.

Heavy-media separation is widely used in the mineral and aggregate industry for separating components of a feed material which have different specific gravities, such as iron ore, copper slag, zinc ore, coal, diamonds, gravel and the like. In this process, the feed material is introduced into a separatory vessel containing a heavy-media suspension which is maintained at a specific gravity intermediate to the specific gravities of the components to be separated. The medium most commonly used is a water suspension of finely ground solid particles, such as ferrosilicon, magnetite, galena, shale, quartz, sand and clay contaminants. The components of the feed material either sink or float in accordance with the gravimetric relationship between their specific gravities and the specific gravity of the medium. For example, if the feed material is an iron ore, the heavier values sink and the lighter gangue floats. With some feed materials, such as coal, the values float and the gangue sinks.

The primary reasons for the wide acceptance of heavy-media separation processes are its simplicity, efficiency and relative ease of control. However, in order to obtain optimum separation, a delicate balance of certain variables is essential. Among these, the two variables most often monitored and controlled are the specific gravity and the consistency of the medium. This latter variable is a function of the settling rate of the solid particles which is generally referred to as the stability of the medium. High stability (i.e., low settling rate) of the solid particles (called a media) is desirable. In practice, an acceptable working range for stability is usually about 50–80 percent. The frequently present clay in the medium acts as a stabilizing agent since the solid particles would otherwise quickly settle if they were mixed in water alone. The concentration of the clay in the medium typically varies between about 3 to 7 weight percent of the media. At these concentrations the medium stability may not be acceptable, and higher clay concentrations might be desired. However, a concentration of clay greater than about 7–8 weight percent raises the apparent viscosity of the medium to a level where the feed material cannot accurately and rapidly stratify and sharply separate into the desired float and sink products.

Rather than run a risk of a high viscosity medium with a resultant poor separation, plant operators usually either sacrifice stability by cleaning most of the clay from the media or add viscosity reducing or dispersing agents, such as hexametaphosphate. If the clay concentration is reduced below about 4 percent, the medium becomes highly unstable and considerable agitation is required to keep the media solids in suspension to maintain a homogeneous "fluid" and a constant specific gravity medium. Either of these operations adds to the overall operating cost of the system.

Even with these and other corrective measures, the operator still is faced with the problem of maintaining an accurate control of the clay concentration in the medium. Fluctuations in the concentration of clay contaminants in the medium (even though within a range which is acceptable from an apparent viscosity standpoint) cause fluctuations in the specific gravity of the suspension and in the differential between the float and sink fractions of the medium with a resultant adverse effect on the efficiency of the separation. Clay is normally introduced into the system in fluctuating amounts from the feed, requiring adjustments to the medium clay concentration to maintain it within an optimum range (e.g. about 4–6 percent). Although reasonably effective means have been developed for reducing clay concentration, an undetermined amount of clay remains in the system as the medium is recirculated. When making an adjustment, it is necessary to estimate the amount of this residual clay. Thus, the accuracy for controlling the clay concentration is highly dependent upon the accuracy of this estimation. Also, there is a substantial system lag between the time an adjustment is made and the time a change in the medium characteristics is effected.

SUMMARY OF THE INVENTION

The primary object of this invention is to provide an improved method for stabilizing suspensions used in heavy-media separation processes whereby operational costs are reduced and an improved separation can be obtained.

Another object of this invention is to provide a heavy media suspension for which the operating characteristics can be easily and rapidly controlled to provide optimum conditions for an effective and efficient separation.

According to the invention, heavy-media suspensions are stabilized with water-soluble heteropolysaccharides which are capable of forming the suspension into a psuedoplastic hydrocolloid. It has been found that, by the controlled addition of such heteropolysaccharides, the stability of the medium is increased without unduly increasing its apparent viscosity with respect to the feed particles, thereby providing conditions for a more effective separation. The resultant psuedoplastic rheology produced by the addition of such heteropolysaccharides provides a medium which exhibits a high apparent viscosity at low shear rates and a low apparent viscosity at high shear rates. Thus, the fine medium particles, which have a low rate of shear, are prevented from settling and the larger feed particles, which have a high rate of shear, move freely as they raise or sink in the medium.

In addition to a more effective separation, heavy-media suspension stabilized in accordance with the invention has many other advantages. Tests have shown that stabilized suspensions can be obtained with very low concentrations of the heteropolysaccharides; concentrations which are substantially below the concentration of clay required to obtain a stable suspension. For most separation processes, a viscosity reducing additive is not required, as often as the case when clay is used for stabilization. Both of these factors result in a reduction of operating costs.

The resultant psuedoplastic medium is capable of suspending larger media particles without impairing separation, i.e. movement of the larger feed particles.

Thus, media production costs can be reduced because the particles do not have to be as finely ground or atomized. Use of coarser media particles also permit easier and more effective recovery of the media solids in the cleaning circuits with a resultant cost savings. Since the heteropolysaccharides dissolve in the water and most of the water is retained in the separatory system, loss of stabilizing additive is minimized resulting in still further cost savings. Consistency of the medium can be easily adjusted to the desired level by simply adding appropriate amounts of the heteropolysaccharides. The rapid response of such an adjustment permits more accurate control of the process. The shear thinning characteristics of the pseudoplastic medium provides good pumping characteristics and reduces pressure drops in the medium circulating system. Plant start-up after a shutdown period is much easier because the media, if it separates at all, settles into a mud-like consistency, which is much easier to dislodge than the hard mass produced by settled clay-supported media.

DESCRIPTION OF THE PREFERRED EMBODIMENT

The heavy-media suspension of this invention is comprised of a water suspension of finely-ground particles of conventional media, such as ferrosilicon, magnetite, ground shale, galena, quartz, sand, mill scale, iron pyrites, copper pyrites, hematite, flue dust, tungsten, barytes or the like and mixtures thereof, containing a water-soluble heteropolysaccharide as the stabilizing additive. The suspension may also include small amounts of clay contaminants; however, the water-soluble polymer is the primary stabilizing constituent.

The water-soluble heteropolysaccharides used as the stabilizing agent are produced by the action of bacteria of the genus Xanthomonas on carbohydrates. Representative species of these bacteria which can be used to produce the heteropolysaccharide include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum* and *Xanthomonas vesicatoria*. Heteropolysaccharides produced from the species *Xanthomonas begoniae, Xanthomonas campestris, Xanthomonas incanae,* and *Xanthomonas pisi* are particularly effective as a stabilizing additive at low concentrations and, therefore, are preferred. An exemplary method for preparing these heteropolysaccharide is described in U.S. Pat. No. 3,020,206.

The medium can be stabilized with lower concentrations of the heteropolysaccharides, without impairing the movement of the feed particles, by cross-linking the heteropolysacchrides. This cross-linking can be accomplished by adding water-soluble materials containing certain polyvalent metal cations, such as trivalent chromium compounds (e.g. chromium bromide, chromium chloride, chromium nitrate, basic chromium sulfate, chromium ammonium sulfate, chromium potassium sulfate, and the like) to the aqueous suspension. This cross-linking process is more completely described in U.S. Pat. No. 3,243,000. The cross-linked heteropolysaccharides are particularly preferred because smaller concentrations are required to produce the desired pseudoplastic rheology and larger media solids can be used. Tests have shown that anionic or nonionic polymers are more effective for the purpose of this invention because some cationic polymers cause an undesirable flocculation of the suspended media particles.

The specific type and amount of heteropolysaccharide used for any particular separation process depends upon several factors, such as type, shape and size distribution of the media solids used, the desired specific gravity of the medium, type and size of feed particles, etc. Generally, sufficient amounts of a heteropolysaccharide are added to the medium to provide it with pseudoplastic rheological characteristics whereby the stability is in excess of about 50 percent, preferably in excess of about 60 percent, yet the plastic viscosity is low enough to permit the feed particles to move rapidly through the medium so as to obtain an efficient and accurate separation. Generally, an effective separation of most feeds can be obtained with a plastic viscosity less than about 55 centipoises.

Preferably, the concentration of water-soluble heteropolysaccharide used is within the range of about 0.01 to about 1.0 weight percent, based on the weight of the water in the suspension. It has been found for some media, concentrations of a heteropolysaccharide higher than 1.0 percent increases the apparent viscosity of the medium to levels where a viscosity reducing additive is required in some cases, especially for media of higher specific gravities. Concentrations lower than about 0.01 percent generally do not provide an acceptable stability. Most preferably, the concentration of the heteropolysaccharide is in the range of about 0.05 to about 0.5 percent.

As indicated above, any conventional type of media can be used so long as it is chemically inert with the water and the feed. The amount of media used depends primarily upon the specific gravity desired for the particular suspension medium, which can be within the range conventionally used, for heavy-media suspensions, e.g., from about 1.3 to about 3.6 gm/cm. The media can have any particle size conventionally used for heavy-media suspensions. Because of the superior suspending capability imparted to the medium by the heteropolysaccharides, media having larger than conventional particle size also can be used so long as an acceptable stability is maintained. The suspension medium can include other conventional additives, such as surface active agents for viscosity and/or slime control and preservatives which do not adversely affect the rheological characteristics of the medium.

Heavy-media suspensions stabilized in accordance with this invention can be used with many different feed materials such as iron ore, copper ore and slag, zinc ore, coal, diamonds, gravel and the like, as well as solid waste material such as shredded scrap metal, glass and plastics, incinerator slag, and the like.

The following examples are presented to illustrate this invention and should not be construed as limitations thereto.

EXAMPLE 1

Tests were run to compare the stability of a heavy-media suspension containing a heteropolysaccharide as a stabilizing additive according to this invention with a suspension containing no stabilizing additive (control) and a suspension containing clay as the stabilizing agent. The suspensions for all of the samples were a water suspension of ferrosilicon particles (60 percent passing a 200 mesh screen) having a specific gravity of 2.5. Stability, expressed in percentage, was measured by the technique described by M. R. Geer et al in *U.S. Bureau of Mines Investigation Report* 5354 (1957). The results from these tests are tabulated below in Table I.

TABLE I

| SAMPLE | ADDITIVE | ADDITIVE CONCENTRATION WT. % (BASED ON WT. OF WATER) | STABILITY, % (GEER) |
|---|---|---|---|
| 1 | Control | — | 18 |
| 2 | Kelzan XC[(1)] | 0.166 | 74 |
| 3 | Clay | 5.1 | 68 |

[(1)]A polysaccharide produced by *Xanthomonas campestris*, marketed by Kelco Co., San Diego, Calif.

From these test results, it can be seen that heavy-media suspensions using a heteropolysaccharide (Sample 2) exhibited a stability far superior to the control sample. Also, this suspension exhibited a stability comparable to or superior to the one employing clay (Sample 3), even though a substantially lower amount of the stabilizing additive was used. This reduction in the amount of stabilizing additive represents a substantial savings in operating costs.

EXAMPLE 2

Tests were run to compare the apparent viscosity of heavy-media suspensions using a heteropolysaccharide as a stabilizing agent with suspensions using sufficient clay to produce comparable stabilities. The stabilities of the suspensions were measured by the technique described in Example 1 and the apparent viscosities were measured by a Devaney - Shelton capillary consistometer. Plastic viscosity and yield stress of the suspensions using a heteropolysaccharide were measured by a consistometer described in U.S. Pat. No. 3,512,395. Results of these tests are tabulated below in Table 2.

From these test results, it can be seen that the heavy-media suspensions using a heteropolysaccharide as a stabilizing additive had apparent viscosities which were approximately 62–68 percent less than the apparent viscosities of clay-supported suspensions containing sufficient clay to provide comparable stabilities. This substantial reduction in apparent viscosity allows the feed particles to move freely through the medium with a resultant sharper and more effective separation. The high viscosity exhibited by the clay-supported suspension containing 7.1 percent clay (i.e. 180) would be unacceptable for most separation processes. Because of the lower apparent viscosity resulting from the use of a heteropolysaccharide as the stabilizing additive, viscosity reducing additives commonly used with clay-supported supensions are not required for many separation processes.

EXAMPLE 3

Experiments were run to evaluate the rheological behavior of heavy-media suspensions having different specific gravities and to which varying amounts of a heteropolysaccharide were added. Magnetite, ferrosilicon, a 50/50 mixture of magnetite and ferrosilicon were used as the heavy-media constituents. The media used for these suspensions have the following particle size distribution: magnetite=59 percent passing a + 150 mesh screen, ferrosilicon=72 percent passing a + 150 mesh screen and magnetite/ferrosilicon=77 percent passing a + 150 mesh screen. The heteropolysaccharide used for these tests was produced by *Xanthamonas campestris* organism (Kelzan XC, marketed by Kelco Co., San Diego, Calif.). Plastic viscosity, yield stress, apparent viscosity and stability were measured in the same manner as described in Examples 1 and 2. The results from these experiments with magnetite, ferrosilicon and 50/50 magnetite/ferrosilicon media are tabulated below in Tables 3, 4 and 5, respectively. In all of these tables, the concentration of the heteropolysaccharide is expressed in weight percent, based on the total weight of the water in the suspension.

TABLE II

| MEDIA | MEDIA SPEC. GRAV., g/cm³ | ADDITIVE | ADDITIVE CONCENTRATION | | PLASTIC VISCOSITY cps. | YIELD STRESS dynes/cm² | APPARENT VISCOSITY cps. | STABILITY % (GEER) |
|---|---|---|---|---|---|---|---|---|
| | | | % OF WATER WEIGHT | % OF TOTAL SOLID WT. | | | | |
| Magnetite (80% passing 100 mesh screen) | 1.5 | Kelzan XC[(1)] | 0.07 | 0.097 | 4 | 5 | 6 | 42 |
| | | Clay | — | 4.6 | — | — | 16 | 44 |
| Ferrosilicon (80% passing 150 mesh screen) | 2.55 | Kelzan XC[(1)] | 0.14 | 0.033 | 15 | 16 | 18 | 68 |
| | | Clay | — | 5.2 | — | — | 56 | 65 |
| Ferrosilicon (70% passing 150 mesh screen) | 3.32 | Kelzan XC[(1)] | 0.125 | 0.023 | 46 | 48 | 68 | 79 |
| | | Clay | — | 7.1 | — | — | 180 | 79 |

[(1)]A polysaccharide produced by *Xanthomonas campestris*, marketed by Kelso Co., San Diego, California.

TABLE III

RHEOLOGICAL CHARACTERISTICS OF SUSPENSIONS WITH MAGNETITE MEDIA

| SPECIFIC GRAVITY OF SUSPENSION | POLYMER CONC., WT % OF WATER IN SUSPENSION | PLASTIC VISCOSITY Cps | YIELD STRESS Cps | APPARENT VISCOSITY Cps | STABILITY % (GEER) |
|---|---|---|---|---|---|
| 1.5 | .072 | 4 | 5 | 6 | 42 |
| do. | .14 | 8 | 9 | 11 | 60 |
| do. | .29 | 13 | 32 | 26 | 75 |

TABLE III—Continued

RHEOLOGICAL CHARACTERISTICS OF SUSPENSIONS WITH MAGNETITE MEDIA

| SPECIFIC GRAVITY OF SUSPENSION | POLYMER CONC., WT % OF WATER IN SUSPENSION | PLASTIC VISCOSITY Cps | YIELD STRESS Cps | APPARENT VISCOSITY Cps | STABILITY % (GEER) |
|---|---|---|---|---|---|
| 1.75 | .023 | 3 | 2 | 4 | 55 |
| do. | .115 | 4 | 6 | 11 | 70 |
| do. | .345 | 15 | 28 | 41 | 86 |
| 2.0 | .033 | 12 | 10 | 6 | 72 |
| do. | .33 | 29 | 76 | 57 | 86 |
| do. | .56 | 38 | 126 | — | 90 |
| 2.5 | .06 | 29 | 52 | 11 | 77 |
| do. | .30 | 43 | 90 | 34 | 85 |
| do. | .60 | 65 | 156 | — | 92 |

TABLE IV

RHEOLOGICAL CHARACTERISTICS OF SUSPENSIONS WITH FERROSILICON MEDIA

| SPECIFIC GRAVITY OF SUSPENSION | POLYMER CONC., WT % OF WATER IN SUSPENSION | PLASTIC VISCOSITY Cps | YIELD STRESS Cps | APPARENT VISCOSITY Cps | STABILITY % (GEER) |
|---|---|---|---|---|---|
| 1.5 | .02 | 13 | 21 | 8 | 30 |
| do. | .26 | 14 | 30 | 15 | 42 |
| 2.0 | .38 | 26 | 62 | 42 | 55 |
| do. | .54 | 32 | 95 | 110 | 70 |
| 2.5 | .05 | 8 | 10 | 7 | 30 |
| do. | .14 | 16 | 15 | 13 | 65 |
| do. | .47 | 60 | 80 | 140 | 73 |
| do. | .70 | 140 | 220 | — | 87 |
| 3.0 | .07 | 26 | 46 | 12 | 60 |
| do. | .35 | 65 | 99 | 90 | 90 |
| do. | .70 | — | — | — | 89 |
| 3.25 | .084 | 55 | 96 | — | 62 |
| do. | .44 | 110 | 218 | — | 86 |
| do. | .84 | — | — | — | 85 |

TABLE V

RHEOLOGICAL CHARACTERISTICS OF SUSPENSIONS WITH 50/50 MAGNETITE/FERROSILICON

| SPECIFIC GRAVITY OF SUSPENSION | POLYMER CONC., WT % OF WATER IN SUSPENSION | PLASTIC VISCOSITY Cps | YIELD STRESS Cps | APPARENT VISCOSITY Cps | STABILITY % (GEER) |
|---|---|---|---|---|---|
| 1.5 | .14 | 11 | 5 | 4 | 40 |
| do. | .21 | 13 | 12 | 6 | 66 |
| do. | .27 | 15 | 22 | 9 | 87 |
| 2.0 | .03 | 10 | 2 | 4 | 40 |
| do. | .09 | 11 | 2 | 6 | 60 |
| do. | .30 | 17 | 19 | 20 | 88 |
| do. | .45 | 19 | 42 | 65 | 85 |
| do. | .60 | 23 | 70 | — | 81 |
| 2.25 | .04 | 14 | 4 | 5 | 57 |
| do. | .20 | 21 | 40 | 14 | 89 |
| do. | .40 | 28 | 140 | 49 | 88 |
| do. | .61 | — | — | — | 81 |
| do. | .82 | — | — | — | 69 |
| 2.50 | .05 | 16 | 10 | 5 | 88 |
| do. | .16 | 21 | 28 | 18 | 94 |
| do. | .26 | 26 | 50 | 37 | 89 |
| do. | .53 | 39 | 150 | 120 | 81 |
| do. | .61 | 50 | — | — | 71 |
| 2.75 | .06 | 25 | 36 | 10 | 88 |
| do. | .33 | 48 | 100 | 40 | 87 |
| do. | .66 | 74 | 180 | 157 | 76 |
| do. | .99 | — | — | — | 62 |
| do. | 1.32 | — | — | — | 40 |
| 3.00 | .08 | 48 | 125 | 22 | 78 |
| do. | .25 | 57 | 126 | 47 | 80 |
| do. | .82 | — | 210 | — | 65 |
| do. | 1.24 | — | — | — | 45 |

From these test results, it can be seen that suspensions having an acceptable stability can be obtained with very low concentrations of the heteropolysaccharide, the lower limit depending primarily on the type of media particles and the specific gravity of suspension being used. For instance, it can be seen that a reasonably stable suspension, utilizing a magnetite media and having a specific gravity of 1.75, can be obtained with a heteropolysaccharide concentration as low as 0.023 percent. Concentrations as low as 0.01 percent can be used when smaller-sized media particles are used and/or the suspension includes a small amount of clay. In the latter case, the heteropolysaccharide supplements the suspending power of the normally present clay.

These test results also show that, as a concentration of the heteropolysaccharide is increased above 1.0 percent (i.e. 50/50 magnetite/ferrosilicon suspensions having specific gravities of 2.75 and 3.00), the stability of the suspension is decreased below an acceptable level, i.e., about 50 percent. In some cases, suspensions containing higher concentrations of the heteropolysaccharide exhibited apparent viscosities which are too high for an effective separation for many processes. The polymer concentration at which the viscosity exceeded acceptable limits depended on the nature of the media and the specific gravity of the suspension. In most cases, however, this maximum concentration exceeded 0.5 percent. In these cases, the apparent viscosity can be reduced to an acceptable level by adding an appropriate amount of a conventional viscosity reducing agent, such as hexametaphosphate. The addition of such agents have a minimal effect on the stability since the suspending capability provided by the heteropolysaccharides is primarily a function of the yield stress of the resultant suspension.

From the test results, it can also be seen that, for most of the suspensions tested, a heteropolysaccharide concentration within the range of about 0.05 to about 0.5 percent provides an acceptable stability and an apparent viscosity which is low enough so that a viscosity reducing additive is not required to obtain a good separation.

From the above description it can be seen that the use of heteropolysaccharides as the stabilizing additive for heavy-media suspensions in accordance with this invention produces suspensions which have high stability and are capable of providing more effective separations at reduced operating costs. The specific gravity and consistency of the medium can be easily tailored to meet system requirements by adding an appropriate amount of a heteropolysaccharide (and viscosity reducing agent if required). By use of conventional monitoring instrumentation, the consistency of the recirculated medium can be easily and rapidly controlled to obtain optimum operating levels. When the requirement for an adjustment is indicated by the instrumentation, an appropriate amount of the heteropolysaccharide is added and it immediately dissolves to effect an instantaneous change in consistency to the desired level.

We claim:

1. In a heavy-media separation process for separating materials of a particulate feed wherein the feed is charged into a heavy-media suspension which is maintained at a specific gravity intermediate between the specific gravities of the components of the feed so that the components are separated into a float and a sink product, the improvement comprising, adding to the suspension about 0.01 to about 1 weight percent, based on the total weight of the water of the suspension, of a water-soluble heteropolysaccharide produced by the action of bacteria of the genus Xanthomonas on a carbohydrate so as to produce a stability in excess of about 50 percent and a plastic viscosity less than about 55 centipoises.

2. A process according to claim 1 wherein said heteropolysaccharide is produced by *Xanthomonas campestris*.

3. A process according to claim 2 wherein the amount of said heteropolysaccharide added is from about 0.05 to about 0.5 weight percent, based on the total weight of the water in the suspension.

* * * * *